(12) United States Patent
Oku et al.

(10) Patent No.: US 11,629,560 B2
(45) Date of Patent: Apr. 18, 2023

(54) THREADED CONNECTION FOR STEEL PIPE

(71) Applicants: Nippon Steel Corporation, Tokyo (JP); Vallourec Oil and Gas France, Aulnoye-Aymeries (FR)

(72) Inventors: Yousuke Oku, Tokyo (JP); Masaaki Sugino, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 219 days.

(21) Appl. No.: 16/465,662

(22) PCT Filed: Dec. 27, 2017

(86) PCT No.: PCT/JP2017/046882
§ 371 (c)(1),
(2) Date: May 31, 2019

(87) PCT Pub. No.: WO2018/135267
PCT Pub. Date: Jul. 26, 2018

(65) Prior Publication Data
US 2019/0330930 A1  Oct. 31, 2019

(30) Foreign Application Priority Data
Jan. 18, 2017  (JP) .............................. JP2017-006313

(51) Int. Cl.
*F16L 15/04* (2006.01)
*E21B 17/042* (2006.01)
(Continued)

(52) U.S. Cl.
CPC ............ *E21B 17/042* (2013.01); *F16L 15/04* (2013.01); *F16L 15/002* (2013.01); *F16L 15/004* (2013.01); *F16L 15/06* (2013.01); *F16L 58/182* (2013.01)

(58) Field of Classification Search
CPC ..... F16L 15/004; F16L 15/001; F16L 15/002; F16L 15/04; E21B 17/042
See application file for complete search history.

(56) References Cited

U.S. PATENT DOCUMENTS 2,258,066 A * 10/1941 Oyen .................... F16L 15/004
285/328
4,770,444 A * 9/1988 Hauk ...................... F16L 15/04
285/55
(Continued)

FOREIGN PATENT DOCUMENTS

| CA | 2961189 A1 | 4/2016 |
|---|---|---|
| EP | 3514432 A1 | 7/2019 |

(Continued)

OTHER PUBLICATIONS

English Abstract & Family List of JP2007504420A.
(Continued)

*Primary Examiner* — David Bochna
(74) *Attorney, Agent, or Firm* — Banner & Witcoff, Ltd.

(57) ABSTRACT

A threaded connection for steel pipe with improved sealing performance is provided. A threaded connection (1) includes a pin (10) and a box (20). The pin (10) includes a pin shoulder surface (11), a pin sealing surface (12) and a male thread (13). The box (20) includes a box shoulder surface (21), a box sealing surface (22) and a female thread (23). The male thread (13) and female thread (23) are constituted by wedge threads. When the connection has been made up, the pin shoulder surface (11) is in contact with the box shoulder surface (21), the stabbing flank and load flank of the male
(Continued)

thread (13) are in contact with the stabbing flank and load flank, respectively, of the female thread (23), and the pin sealing surface (12) is in contact with the box sealing surface (22). The shoulder angle is 4° or larger. The shoulder angle is the angle formed by each of the shoulder surfaces (11, 21) with a plane perpendicular to the pipe axis (CL) when the connection is not made up.

4 Claims, 5 Drawing Sheets

(51) Int. Cl.
  *F16L 15/00* (2006.01)
  *F16L 15/06* (2006.01)
  *F16L 58/18* (2006.01)

(56) References Cited

U.S. PATENT DOCUMENTS

| | | | |
|---|---|---|---|
| 5,137,310 A * | 8/1992 | Noel | F16L 15/004 285/333 |
| 6,409,175 B1 | 6/2002 | Evans et al. | |
| 6,626,471 B2 * | 9/2003 | Mallis | F16L 15/004 285/333 |
| 7,988,205 B2 * | 8/2011 | Mallis | F16L 15/004 285/334 |
| 9,719,617 B2 * | 8/2017 | Okada | E21B 17/042 |
| 2003/0067168 A1 * | 4/2003 | Sches | F16L 15/004 285/333 |
| 2003/0111838 A1 * | 6/2003 | Goto | F16L 15/004 285/94 |
| 2004/0108720 A1 * | 6/2004 | Mallis | F16L 15/004 285/334 |
| 2004/0262919 A1 * | 12/2004 | Dutilleul | F16L 15/004 285/333 |
| 2011/0025051 A1 * | 2/2011 | Yamaguchi | F16L 15/004 285/333 |
| 2015/0001841 A1 * | 1/2015 | Oshima | E21B 17/042 285/94 |
| 2018/0252342 A1 * | 9/2018 | Evans | F16L 15/002 |

FOREIGN PATENT DOCUMENTS

| | | |
|---|---|---|
| JP | S48-99718 A | 12/1973 |
| JP | 2005511990 A | 4/2005 |
| JP | 2007504420 A | 3/2007 |
| JP | 2014101983 A | 6/2014 |

OTHER PUBLICATIONS

English Abstract & Family List of JP2014101983A.
English Abstract & Family List of JP2005511990A.
Feb. 27, 2018 (WO) International Search Report PCT/JP2017/046882, English Translation.

\* cited by examiner

THREADED CONNECTION FOR STEEL PIPE

RELATED APPLICATION DATA

This application is a National Stage Application under 35 U.S.C. 371 of co-pending PCT application number PCT/JP2017/046882 designating the United States and filed Dec. 27, 2017; which claims the benefit of JP application number 2017-006313 and filed Jan. 18, 2017 each of which are hereby incorporated by reference in their entireties.

TECHNICAL FIELD

The present disclosure relates to a threaded connection for steel pipe.

BACKGROUND ART

Steel pipes called oil country tubular goods are used, for example, for prospecting or producing oil or natural gas in oil wells or natural gas wells (hereinafter collectively referred to as "oil well"), developing non-conventional resources such as oil sand or shale gas, retrieving or storing carbon dioxide (Carbon dioxide Capture and Storage (CCS)), geothermal power generation, or in hot springs. A threaded connection is used to connect steel pipes.

Threaded connections for steel pipe are generally categorized as coupling-type and integral-type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, the male thread of the steel pipe is screwed onto the female thread of the coupling such that they are made up and connected. An integral-type connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed onto the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and are thus tubular in shape.

A threaded connection for steel pipe is required to have good sealing performance against pressure fluid from the inside (hereinafter also referred to as "internal pressure") and pressure fluid from the outside (hereinafter also referred to as "external pressure"). To address this, the thread connection is provided with a seal that uses metal-to-metal contact. The seal is composed of a pin sealing surface provided on the outer periphery of the pin, and a box sealing surface provided on the inner periphery of the box. The diameter of the pin sealing surface is slightly larger than the diameter of the box sealing surface. The difference between the diameters of the pin and box sealing surfaces will be referred to as amount of interference. When the threaded connection is made up and the sealing surfaces are fitted together, the presence of interference causes the diameter of the pin sealing surface to decrease and the diameter of the box sealing surface to increase. Each of the sealing surfaces tries to return to their original diameter and thus produces an elastic recovery, thereby generating contact pressures on the sealing surfaces, which now adhere to each other along the entire periphery to provide sealing performance.

JP 2007-504420 A discloses a threaded connection designed to maximize the effective contact length of the sealing surfaces. In this threaded connection, the pin sealing surface is arc-shaped, while the box sealing surface is tapered. This publication teaches that this construction provides a contact width that is very effective in the axial direction and a contact pressure distribution that is generally parabolic along the effective contact section.

JP 2014-101983 A discloses a threaded connection designed to ensure sealing performance and compression resistance. This threaded connection includes a pin shoulder surface provided on the tip of the pin, and a box shoulder surface provided on the interior end of the box. When the connection has been made up, the pin and box shoulder surfaces are in contact with each other to form a shoulder assembly. This publication teaches that a contact reactive force from the box shoulder surface against the pin shoulder surface has no centripetal component and thus does not contribute to the diameter-reduction deformation of the tip of the pin, or has a centrifugal component and resists the diameter-reduction deformation of the tip of the pin.

In the threaded connection of this publication, the shoulder angle, which is the angle of intersection between the shoulder surface and a plane perpendicular to the pipe axis, is not smaller than 0° and not larger than 20°. According to this publication, if the shoulder angle is above 20°, the centrifugal component is excessively large, and damages the sealing surfaces.

In the threaded connection of this publication, the outer diameter of the pin shoulder surface is smaller than the outer diameter of the box shoulder surface. According to this publication, this construction prevents production of a pushing force in a diameter-reduction direction from the box against the tip of the pin, thereby preventing the weakening of the contact in the seal caused by this pushing force.

SUMMARY OF DISCLOSURE

As discussed further below, in the threaded connections of the above-discussed patent documents, sealing performance may be further improved. In view of this, an object of the present disclosure is to provide a threaded connection for steel pipe that provides even better sealing performance.

A threaded connection for steel pipe according to the present disclosure includes a tubular pin and a tubular box. The pin is provided adjacent to a steel-pipe body. The pin is inserted into the box such that the box and pin are made up. The pin includes a pin shoulder surface, a male thread, and a pin sealing surface. The pin shoulder surface is a circular surface provided on a tip of the pin. The pin shoulder surface is inclined such that its outer peripheral edge is located further toward the tip of the pin than its inner peripheral edge. The male thread is provided on an outer peripheral surface of the pin. The male thread is a wedge thread. The pin sealing surface is provided on the outer peripheral surface of the pin and is located between the pin shoulder surface and the male thread. The box includes a box shoulder surface, a female thread, and a box sealing surface. The box shoulder surface is a circular surface corresponding to the pin shoulder surface and is provided at an interior end of the box. The box shoulder surface is inclined such that its outer peripheral edge is located further toward the interior end of the box than its inner peripheral edge. The female thread is provided on an inner peripheral surface of the box to correspond to the male thread. The female thread is a wedge thread. The box sealing surface is provided on the inner peripheral surface of the box to correspond to the pin sealing surface. When the connection has been made up, the pin shoulder surface is in contact with the box shoulder surface, a stabbing flank and a load flank of the male thread are in contact with a stabbing flank and a load flank, respectively, of the female thread, and the pin sealing surface is in contact with the box sealing surface. A shoulder angle is 4° or larger. The shoulder angle is an angle formed by each of the pin shoulder surface and the box shoulder surface with a plane perpendicular to a pipe axis when the connection is not made up.

The threaded connection according to the present disclosure provides improved sealing performance.

EMBODIMENTS FOR CARRYING OUT THE INVENTION

One known threaded connection for steel pipe that achieves high torque resistance is a threaded connection that uses wedge threads. A wedge thread has a thread width that gradually varies toward the tip of the pin, and has a stabbing flank and a load flank that both have negative flank angles. A wedge thread has an effect known as self-tightening. That is, in a threaded connection that uses wedge threads, upon completion of make-up, the stabbing flanks of the male and female threads are in contact with each other and the load flanks of the male and female threads are in contact with each other such that the male and female threads are fitted together.

Typically, a threaded connection that uses wedge threads does not have shoulders. For example, the threaded connection of JP 2007-504420 A includes threads constituted by wedge threads but includes no shoulders. On the other hand, a threaded connection including shoulders typically does not use wedge threads. For example, the threaded connection of JP 2014-101983 A includes shoulders, but uses trapezoidal threads, where the stabbing flanks of the threads are not in contact with each other upon completion of make-up.

Thus, in a threaded connection for steel pipe, wedge threads and shoulders are typically not combined. If wedge threads are used in a threaded connection and shoulders are provided, the connection must be designed in such a way that the contact between the stabbing flanks and that between the load flanks (i.e. locking) and the contact between the shoulder surfaces (i.e. shouldering) occur simultaneously. If the locking of the wedge threads and shouldering do not occur simultaneously, a predetermined interference is not introduced into the seal and/or threads, potentially resulting in portions that are weak against combined loads. Further, separate yields may occur in a thread and shoulder along the fastening-torque line. To prevent these phenomena, the manufacture tolerance of the threaded connection must be precisely decided upon. Thus, a combination of wedge threads and shoulders is typically avoided.

Nevertheless, if one disregards the problem of manufacture tolerance, combining wedge threads with shoulders may improve sealing performance. More specifically, the effects of the locking of the wedge threads and shouldering upon completion of make-up may increase contact forces produced in the seal.

The present inventors attempted to find an appropriate angle of the shoulder surfaces to provide good sealing performance in a threaded connection including both wedge threads and shoulders. The present inventors arrived at the threaded connection according to the embodiment.

A threaded connection for steel pipe according to the embodiment includes a tubular pin and a tubular box. The pin is provided adjacent to a steel-pipe body. The pin is inserted into the box such that the box and pin are made up. The pin includes a pin shoulder surface, a male thread, and a pin sealing surface. The pin shoulder surface is a circular surface provided on a tip of the pin. The pin shoulder surface is inclined such that its outer peripheral edge is located further toward the tip of the pin than its inner peripheral edge. The male thread is provided on an outer peripheral surface of the pin. The male thread is a wedge thread. The pin sealing surface is provided on the outer peripheral surface of the pin and is located between the pin shoulder surface and the male thread. The box includes a box shoulder surface, a female thread, and a box sealing surface. The box shoulder surface is a circular surface corresponding to the pin shoulder surface and is located at an interior end of the box. The box shoulder surface is inclined such that its outer peripheral edge is located further toward an interior end of the box than its inner peripheral edge. The female thread is provided on an inner peripheral surface of the box to correspond to the male thread. The female thread is a wedge thread. The box sealing surface is provided on the inner peripheral surface of the box to correspond to the pin sealing surface. When the connection has been made up, the pin shoulder surface is in contact with the box shoulder surface, a stabbing flank and a load flank of the male thread are in contact with a stabbing flank and a load flank, respectively, of the female thread, and the pin sealing surface is in contact with the box sealing surface. A shoulder angle is 4° or larger. The shoulder angle is an angle formed by each of the pin shoulder surface and the box shoulder surface with a plane perpendicular to a pipe axis when the connection is not made up.

The above-described threaded connection includes a male thread and a female thread each constituted by a wedge thread, and a pin shoulder surface and a box shoulder surface. When the connection has been made up, the stabbing flanks of the male and female threads are in contact with each other and the load flanks of the male and female threads are in contact with each other, and the pin shoulder surface and box shoulder surface are in contact with each other. That is, the locking of the wedge threads and shouldering occur upon completion of make-up. This prevents deformation of the pin seal surface and box seal surface provided between the threads and shoulders when a load acts upon them, thereby potentially increasing contact forces between the seal surfaces. Further, each shoulder surface has a shoulder angle of 4° or larger. As described in detail further below, such shoulder angles provide better sealing performance than conventional threaded connections.

The shoulder angle may be 40° or larger.

As discussed in detail further below, shoulder angles of 40° or larger provide good torque resistance.

The shoulder angle may be 60° or smaller.

Typically, increasing shoulder angle reduces the stiffness of the tip of the pin, resulting in low sealing performance. On the other hand, the construction of the threaded connection according to the embodiment is not susceptible to the reduction in the stiffness of the tip of the pin if the shoulder angles are 60° or smaller, thereby maintaining good sealing performance. This point will be described further below.

Embodiments will now be specifically described with reference to the drawings. In the drawings, the same and corresponding elements are labeled with the same characters, and the same description will not be repeated. For ease of explanation, the drawings may show elements in a simplified or schematic manner, or may not show some elements.

[Construction of Threaded Connection]

Figure 1:
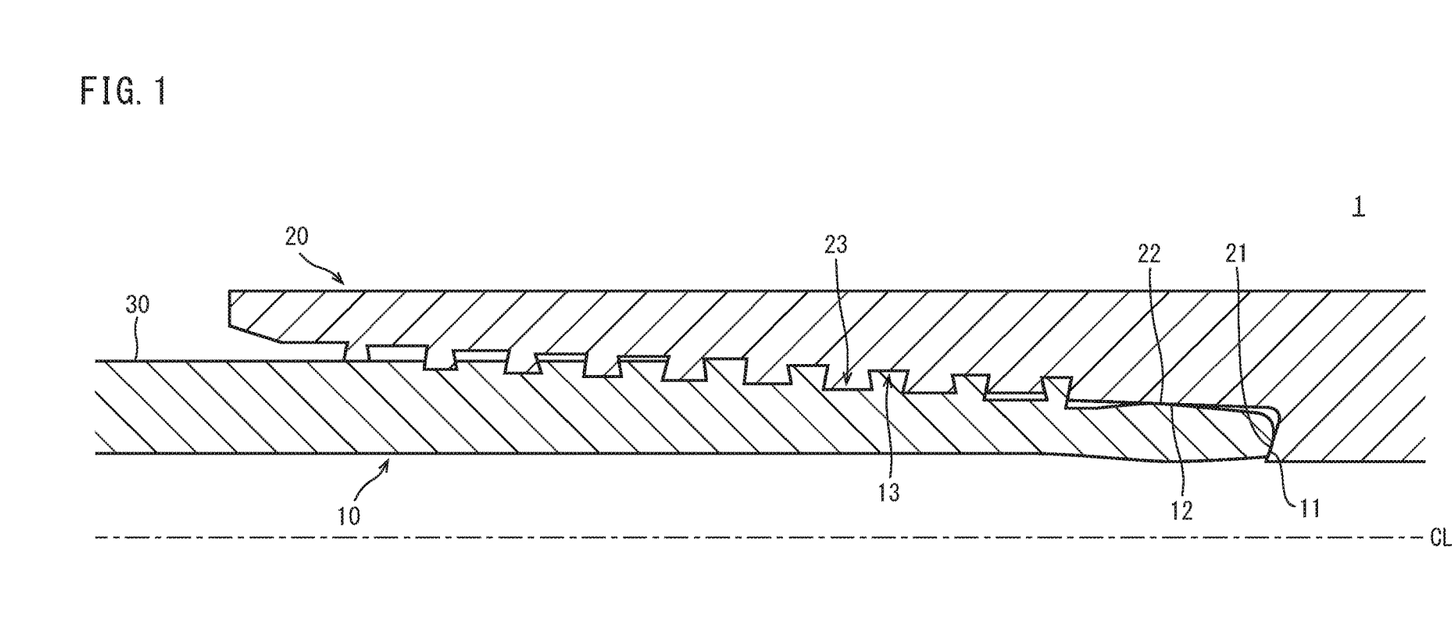
FIG. 1 is a schematic longitudinal cross-sectional view of the threaded connection for steel pipe according to an embodiment.

FIG. 1 is a schematic longitudinal cross-sectional view of a threaded connection 1 for steel pipe according to an embodiment. Longitudinal cross-sectional view means a cross-sectional view taken along a plane containing the pipe axis CL of the threaded connection 1. The threaded connection 1 may be an integral-type threaded connection, or may be a coupling-type threaded connection.

As shown in FIG. 1, the threaded connection 1 includes a pin 10 and a box 20. The pin 10 and box 20 are tubular in shape. The pin 10 is inserted into the box 20 such that the pin 10 and box 20 are made up.

The pin 10 is provided adjacent to the steel-pipe body 30. The pin 10 is formed by machining an end of the steel pipe. The steel-pipe body 30 is a portion of the steel pipe including the pin 10 that is not located in the box 20 after insertion. In the following description, the direction toward the tip of the pin 10 as determined along the direction in which the pipe axis CL extends (i.e. pipe-axis direction) will be referred to as direction toward the inside, forward direction/direction toward the front or direction toward the interior, and the direction toward the steel-pipe body 30 as direction toward the exterior or rearward direction.

The pin 10 includes a pin shoulder surface 11, pin sealing surface 12, and a male thread 13. The pin shoulder surface 11, pin sealing surface 12 and male thread 13 are arranged in this order as determined along the rearward pipe-axis direction.

The pin shoulder surface 11 is provided on the tip of the pin 10. The pin shoulder surface 11 is provided on the tip surface of the pin which is tubular in shape. As such, the pin shoulder 11 is a circular surface.

The pin sealing surface 12 is provided on the outer peripheral surface of the pin 10. The pin sealing surface 12 is located between the pin shoulder surface 11 and male thread 13. The pin sealing surface 12 is constituted by, for example, the peripheral surface of a solid of revolution obtained by rotating an arc or elliptic arc about the pipe axis CL or the peripheral surface of a truncated cone whose axis is represented by the pipe axis CL. Alternatively, the pin sealing surface 12 is constituted by a combination of two or more such peripheral surfaces.

The male thread 13 is provided on the outer peripheral surface of the pin 10. The male thread 13 is located further toward the steel-pipe body 30 than the pin sealing surface 12. The male thread 13 is constituted by a wedge thread. A wedge thread is shaped such that the thread width gradually decreases as it goes from the top toward bottom of the thread. The male thread 13 is constituted by a tapered male thread having a thread outer diameter that decreases toward the tip of the pin 10. The thread width of the male thread 13 gradually decreases toward the tip of the pin 10.

The box 20 includes a box shoulder surface 21, a box sealing surface 22, and a female thread 23. The box shoulder surface 21, box sealing surface 22 and female thread 23 are arranged in this order as determined along the rearward pipe-axis direction.

The box shoulder surface 21 corresponds to the pin shoulder surface 11 and is located at the interior end of the box 20. Similar to the pin shoulder surface 11, the box shoulder 21 is circular in shape. When the connection has been made up, the box shoulder surface 21 is in contact with the pin shoulder surface 11 and, together with the pin shoulder surface 11, forms a shoulder assembly. The pin and box shoulder surfaces 11 and 21 serve as a stop for limiting screw-in of the pin 10. The pin and box shoulder surfaces 11 and 21 serve to generate a thread-tightening axial force of the threads inside the connection.

The box sealing surface 22 corresponds to the pin sealing surface 12 and is located on the inner peripheral surface of the box 20. The box sealing surface 22 is located between the box shoulder surface 21 and female thread 23. The box sealing surface 22 is constituted by, for example, the peripheral surface of a solid of revolution obtained by rotating an arc or elliptic arc about the pipe axis CL or the peripheral surface of a truncated cone whose axis is represented by the pipe axis CL. Alternatively, the box sealing surface 22 is constituted by a combination of two or more such peripheral surfaces. When the connection has been made up, the box sealing surface 22 is in contact with the pin sealing surface 12 and, together with the pin sealing surface 12, forms a seal using metal-to-metal contact.

The female thread 23 corresponds to the male thread 13 and is located on the inner peripheral surface of the box 20. The female thread 23 is constituted by a wedge thread that engages the wedge thread constituting the male thread 13. The female thread 23 is constituted by a tapered female thread having a thread inner diameter that decreases toward the interior end of the box 20. When the connection has been made up, the female thread 23, together with the male thread 13, forms a thread assembly. The threads are preferably single-start threads or double-start threads.

The threads constituted by the male and female threads 13 and 23 each have a thread width that gradually varies toward the tip of the pin. However, a portion of each thread may have a constant thread width. For example, the inner end and/or outer end, as determined along the pipe-axis direction, of each thread may have a constant thread width.

Figure 2:
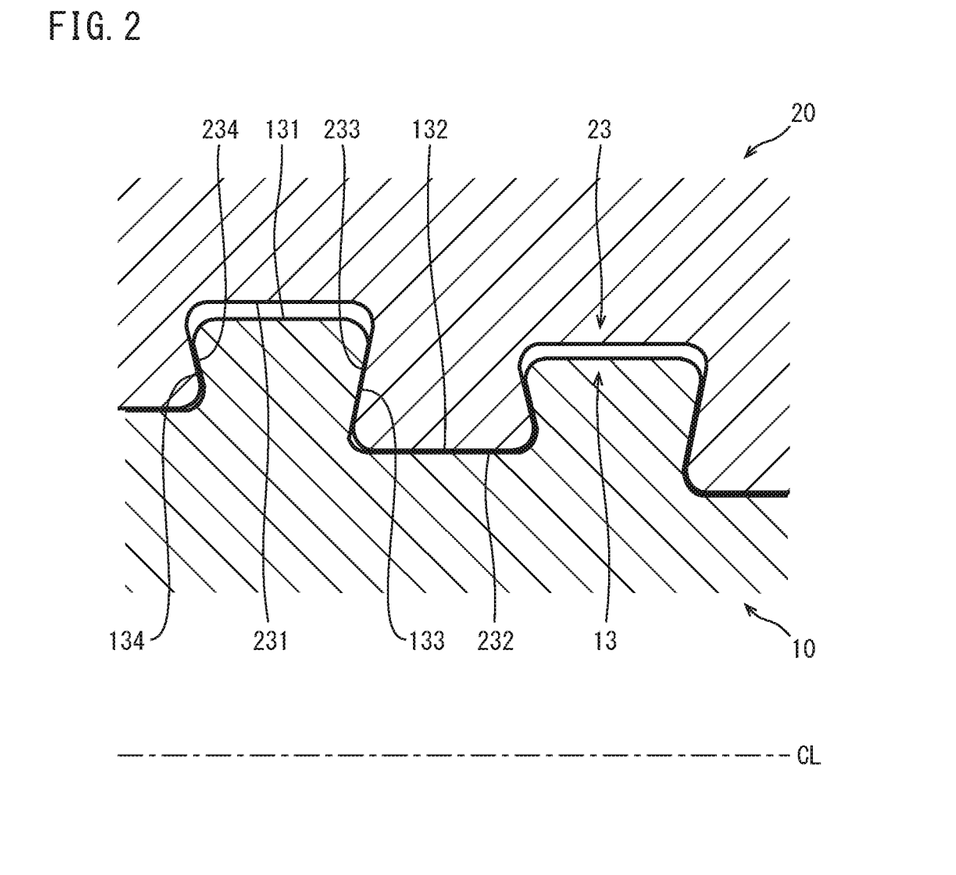
FIG. 2 is a partial enlarged view of the threaded connection shown in FIG. 1.

FIG. 2 is a partial enlarged view of the thread connection 1. FIG. 2 shows an enlarged view of the threads of the threaded connection 1.

As shown in FIG. 2, the male thread 13 includes a thread crest 131, a thread root 132, a stabbing flank 133 and a load flank 134. The stabbing flank 133 and load flank 134 are flanks connecting the thread crest 131 and thread root 132. The stabbing flank 133 is a surface that goes first when the pin 10 is being screwed into the box 20. The load flank 134 is located on the side of the thread crest 131 that is opposite to the stabbing flank 133.

The stabbing flank 133 and load flank 134 have a negative flank angle. Flank angle refers to the angle formed by a straight line perpendicular to the pipe axis CL and the flank as appears in a longitudinal cross section of the threaded connection 1.

In the context of the flank angle of the stabbing flank 133, the negative direction is defined as the clockwise direction. As such, the stabbing flank 133, having a negative flank angle, is inclined such that the outer periphery is located forward of the inner periphery as determined along the pipe-axis direction. In the context of the flank angle of the load flank 134, the negative direction is defined as the counterclockwise direction. As such, the load flank 134, having a negative flank angle, is inclined such that the outer periphery is located rearward of the inner periphery as determined along the pipe-axis direction.

The female thread 23 includes a thread root 231, a thread crest 232, a stabbing flank 233, and a load flank 234. The stabbing flank 233 and load flank 234 are flanks connecting the thread root 231 and thread crest 232. The load flank 234 faces the stabbing flank 233 such that they sandwich the thread root 231.

The stabbing flank 233 and load flank 234 have a negative flank angle. In the context of the flank angle of the stabbing flank 233, the negative direction is defined as the clockwise direction. As such, the stabbing flank 233 is inclined such that the outer periphery is located forward of the inner periphery as determined along the pipe-axis direction. In the context of the flank angle of the load flank 234, the negative direction is defined as the counterclockwise direction. As such, the load flank 234 is inclined such that the outer periphery is located rearward of the inner periphery as determined along the pipe-axis direction.

When the connection has been made up, the thread root 231 of the female thread 23 faces the thread crest 131 of the male thread 13, where a clearance is provided therebetween. When the connection has been made up, the thread crest 232 of the female thread 23 is in contact with the thread root 132 of the male thread 13. Alternatively, when the connection has been made up, the thread root 231 of the female thread 23 and the thread crest 131 of the male thread 13 are in contact with each other and the thread crest 232 of the female thread 23 and the thread root 132 of the male thread 13 are not in contact with each other.

When the connection has been made up, the stabbing flank 233 of the female thread 23 is in contact with the stabbing flank 133 of the male thread 13. When the connection has been made up, the load flank 234 of the female thread 23 is in contact with the load flank 134 of the male thread 13. At this time, not the entire stabbing flank 233 of the female thread 23 needs to be in contact with the stabbing flank 133 of the male thread 13. For example, a portion of the stabbing flank 233 of the female thread 23 may not be in contact with the stabbing flank 133 of the male thread 13 due to a manufacture tolerance or the like.

Figure 3:
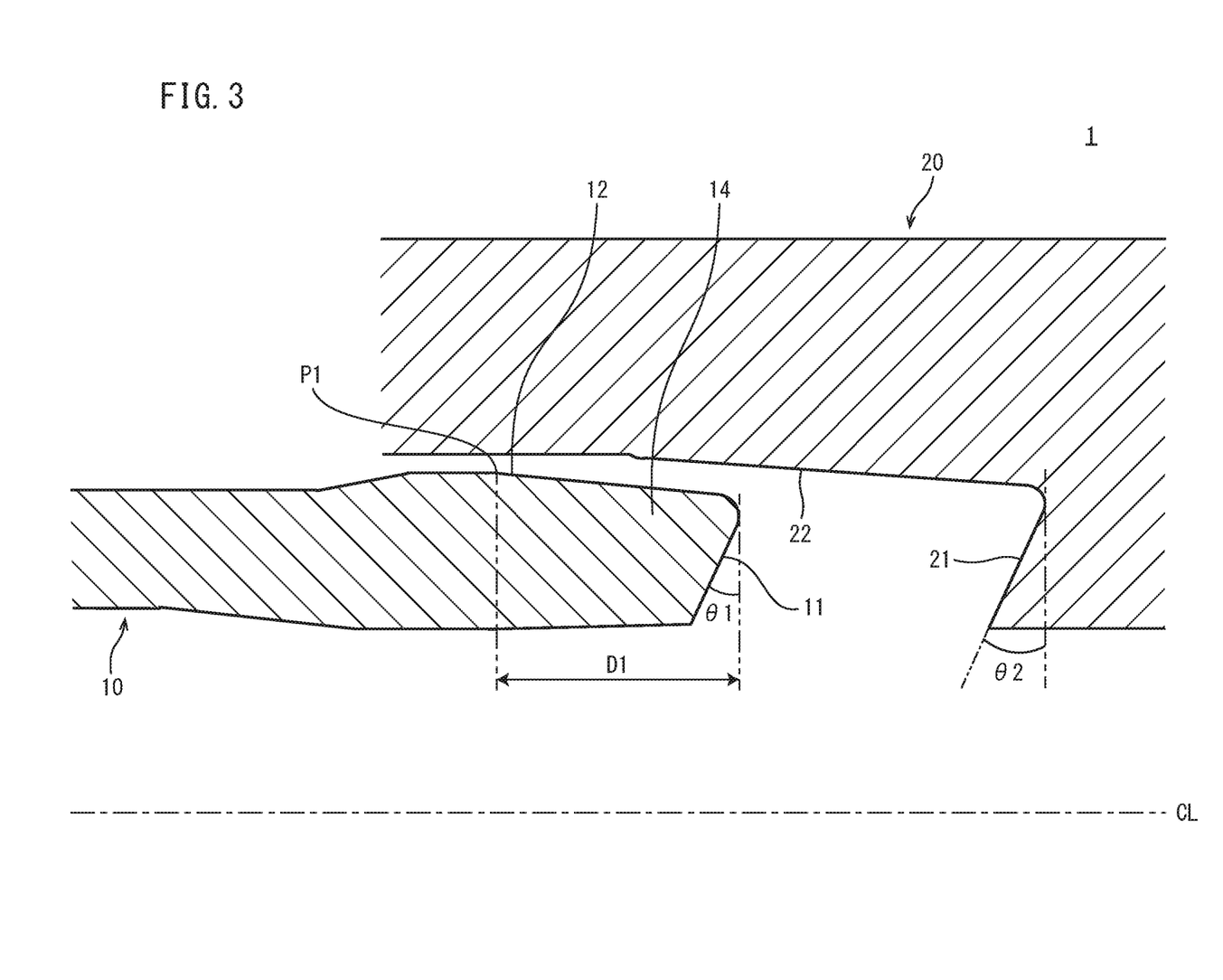
FIG. 3 is a partial enlarged view of the threaded connection shown in FIG. 1.

FIG. 3 is a partial enlarged view of the threaded connection 1. FIG. 3 shows a front portion of the threaded connection 1 when the connection is not made up.

As shown in FIG. 3, the pin shoulder 11 is inclined such that its outer peripheral edge is located further toward the tip of the pin 10 than its inner peripheral edge. The pin shoulder surface 11 has a shoulder angle $\theta 1$. The shoulder angle $\theta 1$ is the angle formed by the pin shoulder surface 11 and a plane perpendicular to the pipe axis CL when the pin 10 and box 20 are not made up.

The box shoulder surface 21 is inclined such that the outer peripheral edge is located further toward the interior end of the box 20 than the inner peripheral edge. The box shoulder surface 21 has a shoulder angle $\theta 2$. The shoulder angle $\theta 2$ is the angle formed by the box shoulder surface 21 and a plane perpendicular to the pipe axis CL when the box 20 and pin 10 are not made up.

The shoulder angle $\theta 2$ of the box shoulder surface 21 is substantially equal to the shoulder angle $\theta 1$ of the pin shoulder surface 11. The shoulder angles $\theta 1$ and $\theta 2$ being substantially equal means that the difference between the shoulder angles $\theta 1$ and $\theta 2$ is within the range of a manufacture tolerance. For example, the difference between the shoulder angles $\theta 1$ and $\theta 2$ is within a range of $\pm 1°$. In the following description, for ease of explanation, the shoulder angles $\theta 1$ and $\theta 2$ may be referred to as shoulder angle $\theta$ when no distinction is made.

To provide good sealing performance, the shoulder angle $\theta$ of the pin and box shoulder surfaces 11 and 21 should be not smaller than 4°. To further improve sealing performance, the shoulder angle $\theta$ is preferably not smaller than 7°, and more preferably not smaller than 20°.

To improve torque resistance, the shoulder angle $\theta$ is preferably not smaller than 40°.

To provide the required stiffness at the tip of the pin 10, the shoulder angle $\theta$ is preferably not larger than 60°. From the viewpoint of realistic manufacture, too, the upper limit of the shoulder angle $\theta$ should be 60° when the inclination angles of the outer peripheral surface of the pin 10 which connects to the pin shoulder surface 11 and the inner peripheral surface of the box 20 which connects to the box shoulder surface 21 as well as the angle of the thread cutting insert for machining the pin 10 and box 20 are taken into consideration.

The shapes of the pin and box sealing surfaces 12 and 22 are not limited to particular ones; the pin sealing surface 12 of the present embodiment is a curved surface protruding toward the outside as determined along a radial direction of the pin 10. On the other hand, the box sealing surface 22 is generally tapered. The diameter of the box sealing surface 22 gradually decreases toward the interior end of the box 20.

In the pin 10, when the connection is not made up, the position P1 with the maximum diameter on the pin sealing surface 12 is located distant from the tip of the pin 10 by a predetermined distance D1 as measured in the pipe-axis direction. The distance D1 may be 5 mm or larger, for example. The pin 10 includes a rigid-body portion 14 located forward of the pin sealing surface 12. The rigid-body portion 14 is a portion of the pin 10 that is located forward of the pin sealing surface 12 as determined along the pipe-axis direction, and includes the pin shoulder surface 11.

The outer diameter of the rigid-body portion 14 decreases toward the tip of the pin. In a longitudinal cross-sectional view of the pin 10, the outer peripheral surface of the rigid-body portion 14 is slightly inclined relative to the pipe axis CL. At least a portion of the outer peripheral surface of the rigid-body portion 14 is not in contact with the inner peripheral surface of the box 20 when the connection has been made up. When a compression load is applied to the threaded connection 1, the rigid-body portion 14 absorbs plastic deformation of the pin sealing surface 11. The rigid-body portion 14 reduces decrease in the contact surface pressure on the box sealing surface 21 by the pin sealing surface 11.

[Effects]

The threaded connection 1 according to the present embodiment includes a pin shoulder surface 11 and a box shoulder surface 21, as well as a male thread 13 and a female thread 23 constituted by wedge threads. When the connection has been made up, the pin shoulder surface 11 abuts the box shoulder surface 21, while the stabbing flanks 133 and 233 of the male and female threads 13 and 23 are in contact with each other and the load flanks 134 and 234 of the male and female threads 13 and 23 are in contact with each other.

Thus, in the threaded connection 1, shouldering and the locking of the threads occur upon completion of make-up. This prevents deflection of the seal located between the shoulders and threads when a load is applied to the threaded connection 1, potentially increasing contact forces between the pin and box sealing surfaces 12 and 22. Further, since the shoulder angle between the pin and box shoulder surfaces 11 and 21 is 4° or larger, good sealing performance can be provided.

Although embodiments have been described, the present disclosure is not limited to the above-illustrated embodiments, and various modifications are possible without departing from the spirit of the disclosure.

EXAMPLES

To verify the effects of the present disclosure, a finite element analysis was conducted for threaded connections for steel pipe in which wedge threads were employed. More specifically, with models of the threaded connection having the basic construction shown in FIGS. 1 to 3, an analysis was conducted while the shoulder angle (θ) of the pin shoulder surface (11) and box shoulder surface (21) was varied, and sealing performance and torque resistance were evaluated. The size of the steel pipe analyzed was 7"26# (with a nominal outer diameter of 177.80 mm and a nominal wall thickness of 9.19 mm), and the steel pipe was made of L80 steel according to the API standards (with a nominal yield strength YS=552 MPa (80 ksi)).

For each model, a combined load condition simulating the ISO 13679 Series A test was used to evaluate the value of seal contact force for each loading step. The minimum value of the seal contact force varying under this condition (minimum seal contact force) was used as an indication of sealing performance.

Further, for each model, an analysis simulating the make-up of the threaded connection was conducted, and the maximum torque value (MTV), which is known as an indication of yield torque, was used to evaluate torque resistance.

Figure 4:
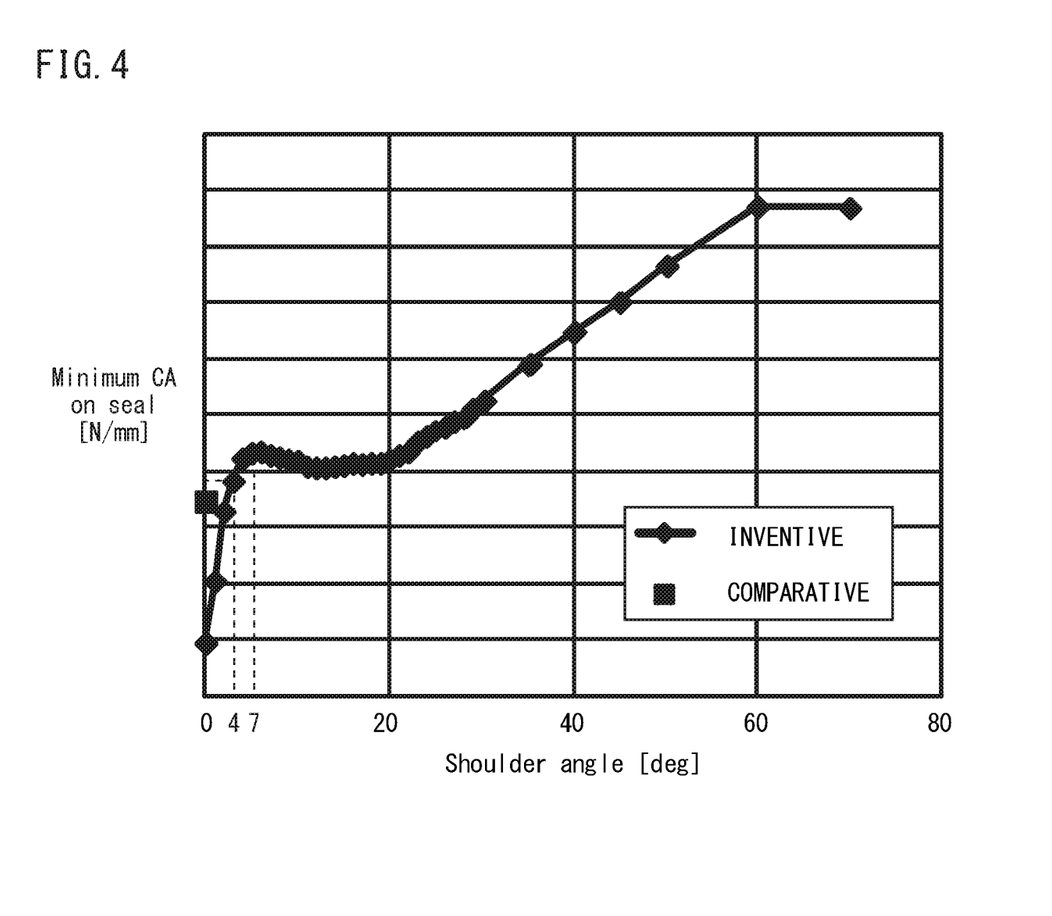
FIG. 4 is a graph showing the relationship between seal contact force and shoulder angle.

The results of the evaluation of sealing performance are shown in FIG. 4. FIG. 4 is a graph showing the relationship between minimum seal contact force and shoulder angle (θ). FIG. 4 also shows the minimum seal contact force of threaded connections with wedge threads without shoulders (comparative examples) for comparison with threaded connections with shoulders and wedge threads (inventive examples).

As shown in FIG. 4, in the threaded connections of the inventive examples, the minimum seal contact force tended to increase as shoulder angle (θ) increased. Typically, it is thought that, as shoulder angle (θ) increases, the stiffness of the tip portion of the pin (10) decreases, thus decreasing the sealing performance, especially against the external pressure. However, in the threaded connections of the inventive examples, a seal was sandwiched between the locked threads and the shoulders, which increased contact surface pressures in the seal, thus reducing deflection of the pin sealing surface (12) when a load was applied. This is presumably why the decrease in sealing performance due to the decrease in the stiffness of the tip portion of the pin (10) was minimized even when shoulder angle (θ) increased.

More specifically, the minimum seal contact force of the threaded connections of the inventive examples increased as shoulder angle (θ) increased; when shoulder angle (θ) reached 4°, it became larger than the minimum seal contact force of the threaded connections of the comparative examples. The minimum seal contact force increased as shoulder angle (θ) increased after shoulder angle (θ) exceeded 4°, but plateaued when the shoulder angle (θ) became 7° or larger. However, when shoulder angle (θ) became 20° or larger, the minimum seal contact force increased again as shoulder angle (θ) increased.

Thus, if shoulder angle (θ) is not smaller than 4°, the seal contact force can be made larger than that of a conventional threaded connection with wedge threads without shoulders, thereby providing good sealing performance. If shoulder angle (θ) is not smaller than 7°, the seal contact force is stable at a value higher than that of a conventional threaded connection, further ensuring that good sealing performance is provided. If shoulder angle (θ) is not smaller than 20°, the seal contact force significantly increases, thereby providing even better sealing performance.

However, if shoulder angle (θ) was larger than 60°, the sealing contact force did not increase anymore even if shoulder angle (θ) increased. This is presumably because the effect of stiffness reduction provided by the tip portion of the pin (10) was too high. In view of this, shoulder angle (θ) is preferably not larger than 60°.

Figure 5:
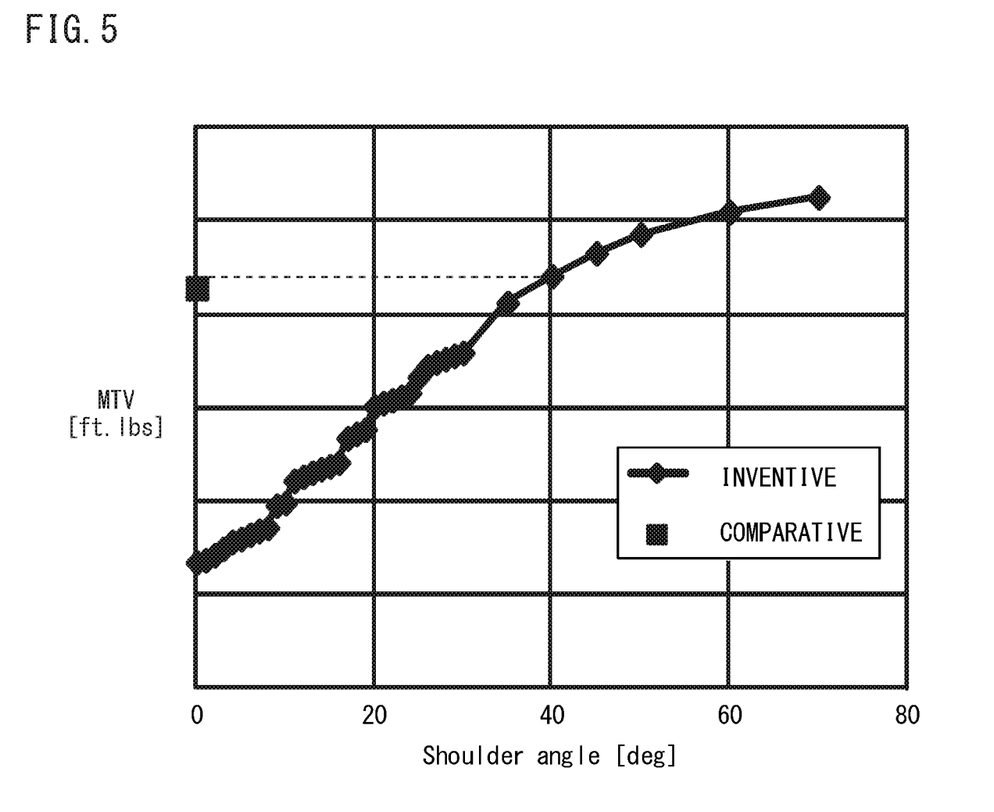
FIG. 5 is a graph showing the relationship between torque resistance and shoulder angle.

The results of the evaluation of torque resistance are shown in FIG. 5. FIG. 5 is a graph showing the relationship between the MTV obtained from the analysis (i.e. torque resistance) and shoulder angle (θ). FIG. 5 also shows the MTV of threaded connections with wedge threads without shoulders (comparative examples) for comparison with threaded connections with shoulders and wedge threads (inventive examples).

As shown in FIG. 5, in the threaded connections of the inventive examples, the MTV tended to increase as shoulder angle (θ) increased. When shoulder angle (θ) was 40° or larger, the MTV of the threaded connections of the inventive examples was larger than the MTV of the threaded connections of the comparative examples. Thus, if shoulder angle (θ) is not smaller than 40°, a torque resistance higher than that of a conventional threaded connection with wedge threads without shoulders can be achieved.

Thus, it was verified that good sealing performance can be achieved if the shoulder angle (θ) of the shoulder surfaces (11, 21) when the connection is not made up is not smaller than 4° and, upon completion of make-up, the stabbing flanks (133, 233) of the threads are in contact with each other and the load flanks (134, 234) of the threads are in contact with each other and the shoulder surfaces (11, 21) are in contact with each other. To provide even better sealing performance, shoulder angle (θ) is preferably not smaller than 7°, and more preferably not smaller than 20°. Further, it was verified that, if shoulder angle (θ) is not smaller than 40°, both good sealing performance and good torque resistance can be achieved. The upper limit of shoulder angle (θ) is not limited to a particular value; preferably, it is 60°

The invention claimed is:

1. A threaded connection for steel pipe, comprising:
a tubular pin provided adjacent to a steel-pipe body; and
a tubular box, the pin being inserted into the box such that the box and pin are made up,
wherein the pin includes:
a pin shoulder surface, the pin shoulder surface being a circular surface provided on a tip of the pin, the pin shoulder surface being inclined such that its outer peripheral edge is located further toward the tip of the pin than its inner peripheral edge;
a male thread provided on an outer peripheral surface of the pin, the male thread being a wedge thread;

a pin sealing surface provided on the outer peripheral surface of the pin and located between the pin shoulder surface and the male thread; and a rigid-body portion located forward of the pin sealing surface, an outer diameter of the rigid-body portion decreasing toward the tip of the pin, wherein the pin sealing surface is a curved surface protruding toward an outside as determined along a radial direction of the pin the pin sealing surface has a position with the largest diameter of the pin between the thread and the tip of the pin, and the box includes:
  a box shoulder surface, the box shoulder surface being a circular surface corresponding to the pin shoulder surface and provided at an interior end of the box, the box shoulder surface being inclined such that its outer peripheral edge is located further toward the interior end of the box than its inner peripheral edge;
  a female thread provided on an inner peripheral surface of the box to correspond to the male thread, the female thread being a wedge thread; and
  a box sealing surface provided on the inner peripheral surface of the box to correspond to the pin sealing surface, when the connection has been made up, the pin shoulder surface is in contact with the box shoulder surface, a stabbing flank and a load flank of the male thread are in contact with a stabbing flank and a load flank, respectively, of the female thread, and the pin sealing surface is in contact with the box sealing surface, contact between the pin shoulder surface and the box shoulder surface, contact between a stabbing flank of the male thread and a stabbing flank of the female thread, and contact between a load flank of the male thread and a load flank of the female thread occur simultaneously, and a shoulder angle is 20° or larger, the shoulder angle being an angle formed by each of the pin shoulder surface and the box shoulder surface with a plane perpendicular to a pipe axis when the connection is not made up.

2. The threaded connection according to claim 1, wherein the shoulder angle is 40° or larger.

3. The threaded connection according to claim 2, wherein the shoulder angle is 60° or smaller.

4. The threaded connection according to claim 1, wherein the shoulder angle is 60° or smaller.

* * * * *